July 17, 1962    A. G. MAKOWSKI ET AL    3,044,894
SPRAY COATING ARTICLES

Filed March 31, 1959    3 Sheets-Sheet 1

INVENTORS
ALEXANDER GEORGE MAKOWSKI
CHARLES HILL HARTFORD
BY James W. Fitzsimmons
George W. Reiber
ATTORNEYS July 17, 1962
A. G. MAKOWSKI ET AL
3,044,894
SPRAY COATING ARTICLES
Filed March 31, 1959
3 Sheets-Sheet 2
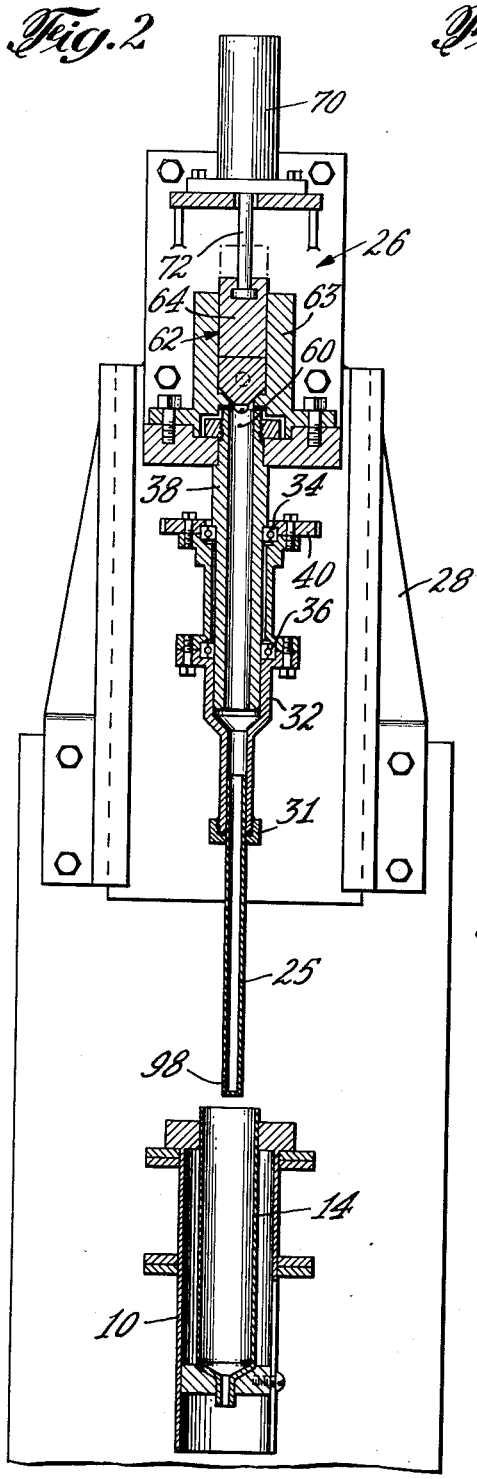
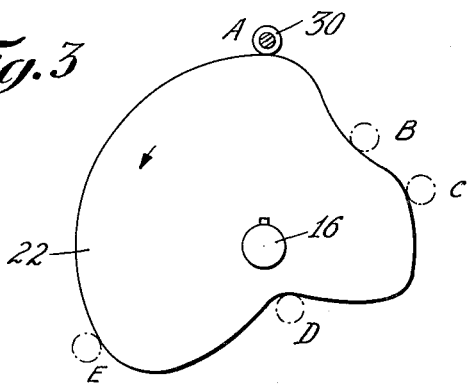
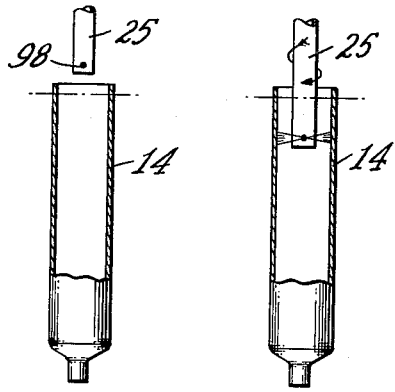
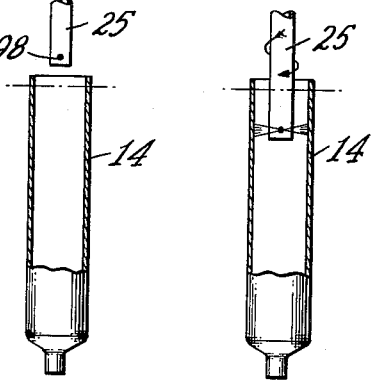
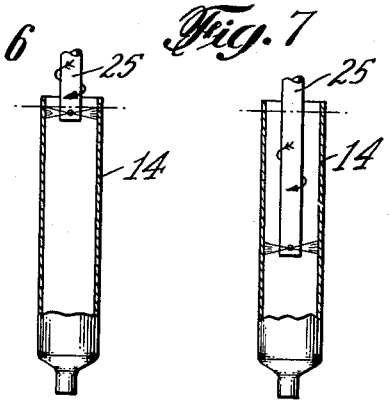
INVENTORS
ALEXANDER GEORGE MAKOWSKI
CHARLES HILL HARTFORD
BY
ATTORNEYS

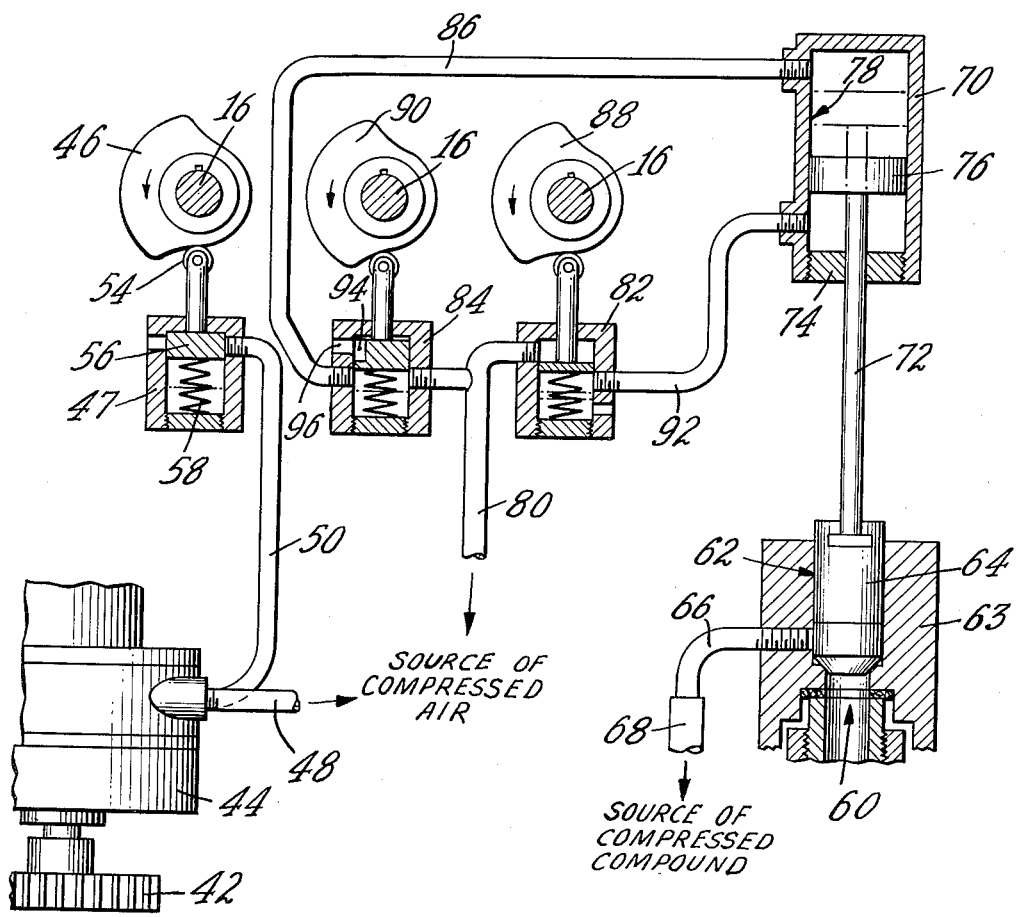

United States Patent Office 3,044,894
Patented July 17, 1962

3,044,894
SPRAY COATING ARTICLES
Alexander George Makowski, Fayville, and Charles Hill Hartford, Maynard, Mass., assignors to American Can Company, New York, N.Y., a corporation of New Jersey
Filed Mar. 31, 1959, Ser. No. 803,249
8 Claims. (Cl. 117—37)

This invention relates to a method of and mechanism for spray coating an article and more specifically to a method of and mechanism that controls the spray pattern for coating such an article.

In the polyethylene tube art, for example, it has been found that the application of a thin film of Saran (polyvinylidene chloride) as a coating to the interior of the tube will make the tube wall impervious to the escape of essential oils, such as perfumes.

One of the problems with the application of a Saran coating is that it is impossible to heat seal through it to either close the end of the tube or to seal-in a plastic stopper. However, if the coating pattern is so controlled that a bare portion of the tube material remains at the sealing end, then the tube may be sealed properly and yet the practical effects of the coating will be attained. It follows therefore, that it is the first object of this invention to provide a method of and mechanism for controlling the pattern of coating the interior of a plastic tube so that a predetermined uncoated area will be left at the sealing portion of the tube.

It is a fact that plastic tubes may be coated by flushing them with a compound and the uncoated sealing portion may be attained by limiting the level of the compound in the tube. Such a process, however, is a slow one—if only for the reason that an amount of compound equal to the volume of the tube must be pumped in and then drained out.

Accordingly, it is a still further object of this invention to provide a method of and means for coating the interior of the tube while using a minimum amount of coating material.

It is a still further object of this invention to provide a method of and means for coating a tube with a compound under pressure while controlling the pattern of application of the compound under pressure.

Numerous other objects and advantages of the invention will be apparent as it is better understood from the following description, which, taken in connection with the accompanying drawings, discloses a preferred embodiment thereof.

Referring to the drawings:

FIG. 2 is an end elevational section taken through plane 2—2 of FIG. 1 in the direction of the arrows;

FIG. 3 is a detail section taken through plane 3—3 of FIG. 1 in the direction of the arrows and showing the contour of a position control cam;

FIGS. 4, 5, 6 and 7 are schematic views showing in sequence the various operating positions of the spray nozzle; and FIG. 8 is a schematic view showing the operation of various valves and their control cams.

Figure 1:
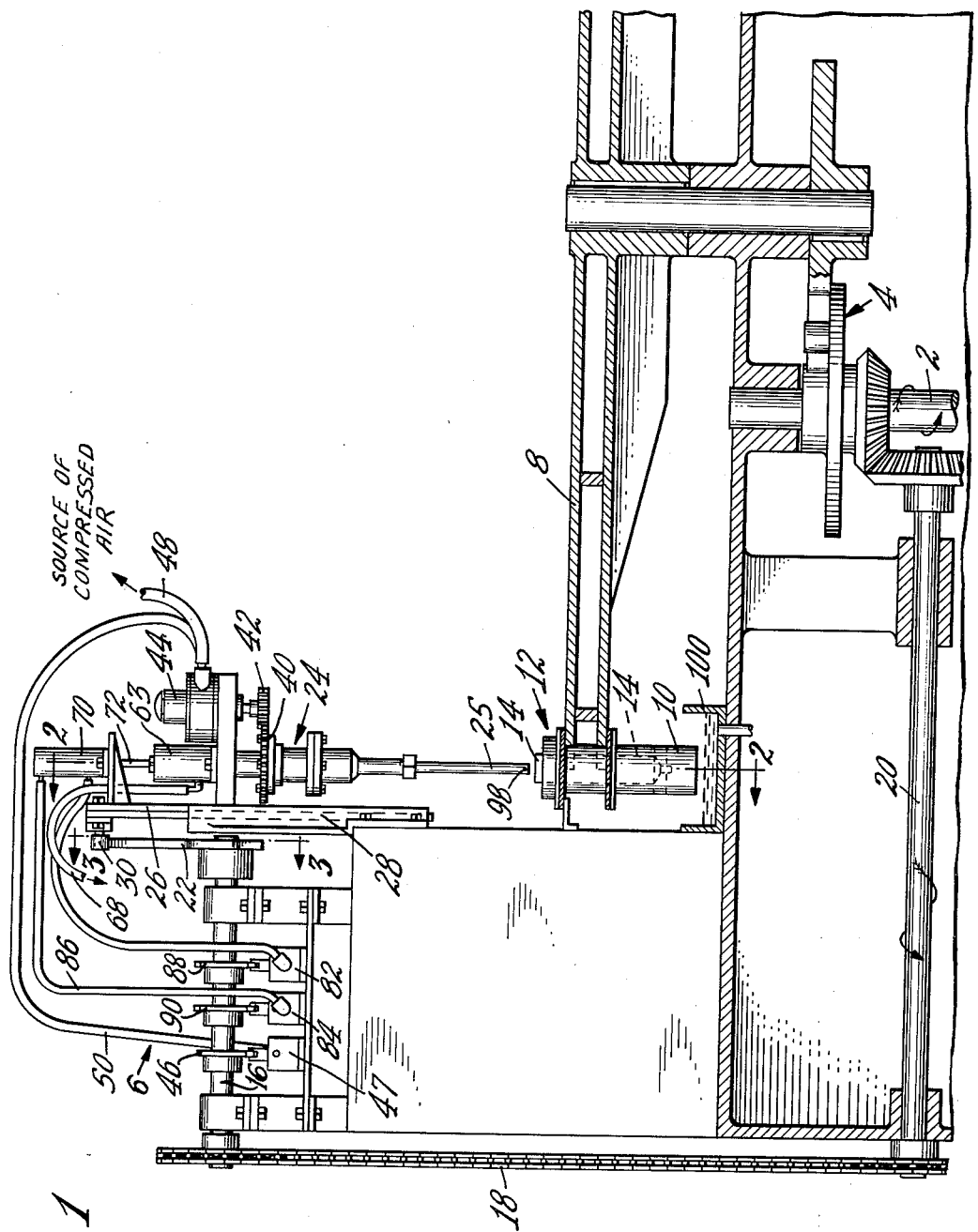
FIGURE 1 is a front elevation of one form of coating mechanism embodying the instant invention and for carrying out the method steps of the invention.

Briefly this invention relates to a method of and a control mechanism which in one cycle of operation advances a tube to a spray position and holds it there during a spray cycle. During the spray cycle cooperating mechanism is activated to advance a spray nozzle into a tube to be coated, spin the spray nozzle, supply spray compound to the spinning nozzle and then control the position of the spray nozzle to regulate the pattern of coating application to insure a full coating while leaving an uncoated sealing margin.

Referring to the drawings and particularly FIGURE 1, a drive shaft 2 is shown driving two separate but coordinated mechanism including a Geneva drive 4 and a spraying mechanism 6. The Geneva drive is of conventional form and is actuated to drive a turntable 8 in cyclic pattern. The turntable carries a plurality of pockets 10, one of which is shown at a spray position 12. Each pocket is adapted to support a tube 14 during a coating operation.

*Turntable Cyclic Pattern*

The cyclic pattern of the turntable movement is such that the Geneva drive 4 moves a pocket 10 into spray position where it remains while mechanism 6 is actuated to coat the tube and then the Geneva mechanism advances another tube into the spray position.

*Spray Nozzle Cycle*

The operation of the spray mechanism 6 is under direct control of a spray shaft 16 which is driven via chain 18 and shaft 20 from the main drive shaft 2. The spray shaft 16 carries a plurality of cams, one of which is the position control cam 22 which regulates the raising and lowering of a spray head 24. The spray head 24, which includes a spray nozzle 25, is supported on a slide 26 positioned for controlled, gravity actuated, vertical movement in a track 28. The control on the vertical movement of the spray head is effected by a cam follower 30 carried by the slide 26 riding in peripheral contact with the position control cam 22.

The details of the position control cam 22 are shown in FIG. 3, wherein a schematic showing is made of the various follower positions relative to the axis of the position control cam 22. (It will be understood that the follower is always in the same vertical plane and hence the vertical position for the spray head 24 is under control of the interaction of the follower 30 and the position control cam 22.)

To fix the perspective of coating operation it should be understood that during one cyclic pattern of turntable movement by the Geneva drive 4, the spray shaft 16, and hence the position control cam 22 will make one complete revolution. During this revolution the follower is preliminarily at high-dwell position A (note corresponding spray nozzle 25 position A in FIG. 4), where the spray nozzle 25 is held above the open end of tube 14. As the position control cam 22 revolves to position B (note corresponding spray nozzle position B in FIG. 5) the follower 30 advances the spray nozzle 25 into the tube 14. As the position control cam revolves to position C (note corresponding spray nozzle position C in FIG. 6) the follower 30 raises the spray nozzle 25 to a position very close to the open end of the tube 14. As the position control cam rotates to position D (note corresponding spray nozzle position D in FIG. 7) the follower 30 causes the spray nozzle 25 to be lowered into the tube 14 from the FIG. 6 to the FIG. 7 position. As the position control cam then advances to position E which is at the same radius as position A, the follower causes the spray nozzle 25 to be raised out of the tube 14. It is to be understood that while the spray nozzle is moved from the FIG. 5 through the FIG. 6 and FIG. 7 positions back to FIG. 4 position, it is to be rotated to throw the lining compound outwardly by centrifugal force and distribute the same on the interior of the tube.

*Spray Nozzle Rotation Control*

With specific reference to FIG. 2, the spray nozzle 25 is mounted by means of a compression fitting 31 onto a rotor 32. The rotor 32 in turn is mounted by means of thrust and roller bearings 34, 36 for rotation about a stator 38. The rotor 32 carries a spur gear 40 which, as shown in FIG. 1, is in mesh with a pinion 42. Pinion 42 is connected to the shaft of, and therefore driven by, a compressed air turbine or other fluid pressure motor 44. It follows that rotation of the compressed air turbine, acting through the pinion 42 and gear 40 drives the rotor 32 about the stator 38.

The spray nozzle 25 is to rotate only while it is within the tube 14. The control for the cyclic spinning as shown in FIG. 8 comprises a turbine control cam 46 mounted on the spray shaft 16 and positioned to actuate a turbine flow control valve 47, including for example a piston 56 urged to closed position by a spring 58 and opened by a cam follower 54 running against cam 46.

The turbine 44 is driven by compressed air entering through a tube 48 and exhausting through a tube 50 which in turn is connected to the atmosphere through the flow control valve 47. With the turbine control cam 46 in its FIG. 8 position the flow control valve prevents air from passing through the turbine which remains at rest. As the turbine control cam 46 rotates during a cyclic revolution of spray shaft 16, the follower 54 moves the piston 56 against the force of spring 58 to the dotted line position thereby opening the flow control valve 47 and thus actuating the turbine 44. The air turbine 44 is driven at a high rate of speed and consequentially spins the spray nozzle 25 at a high speed.

*Compound Flow Control*

As shown in FIG. 2 the stator 38 is mounted on the slide 26 in such a manner that stator open end 60 is in communication with a chamber 62. The chamber, which is defined by wall 63, carries a valve piston 64, which in its normal position (shown in FIG. 2) closes the open end 60 of the stator 38.

With reference to FIG. 8 it will be observed that the valve piston 64 acts to close the throat of an inlet pipe 66 which extends from the chamber 62 through the wall 63 where it is coupled by means of the flexible hose 68 to the source of compound which is to be sprayed in the tube. The compound is held under pressure by some conventional source. It will be understood that as the valve piston 64 is raised, the compound under pressure will pass through the flexible hose 68 and the inlet pipe 66 into the chamber 62, through the stator 38 into the rotor 36 and down to the tip of the spray nozzle 25.

The operation of the valve piston 64 is controlled by a conventional air cylinder arrangement 70. The valve piston 64 is connected by means of a stem 72 passing through the packing gland 74 of the air cylinder 70 to the piston 76 thereof. The piston 76 is movable within the cylinder wall 78 from its normal or valve closing position shown in FIG. 8 to an actuated position (shown in dotted lines) which raises the valve piston 64 to permit the compound to flow into the spray nozzle 25. The movement of the piston 76 is under the control of compressed air entering through an inlet pipe 80 which is connected both to a lower chamber valve 82 and an upper chamber valve 84. In the position shown in FIG. 8 the compressed air flows through the upper chamber valve 84 and through flexible hose 86 to act on the upper side of piston 76 urging valve piston 64 into sealing engagement with the open end 60 of the stator 38. In the FIG. 8 position the underside of piston 76 is at atmospheric pressure, vented through lower chamber valve 82.

The operation of lower chamber valve 82 and upper chamber valve 84 respectively, are controlled by lower chamber cam 88 and upper chamber cam 90, each secured to the spray shaft 16 for rotation therewtih. As the spray shaft 16 goes through one cyclic revolution, the cams 88, 90 move the lower chamber valve 82 and upper chamber valve 84 from their FIG. 8 position to an actuated (dotted line) position wherein the compressed air from inlet 80 is blocked from entering upper chamber valve 84 and instead passes through lower chamber valve 82 and through the flexible hose 92 into the air cylinder 70 to raise the piston 76 and hence valve piston 64 to permit the compound to flow into the spray nozzle 25. It will be noted that when the lower chamber valve 82 and the upper chamber valves are in their actuated positions, the upper surface of piston 76 is vented to the atmosphere via a piston recess 94 and port 96 of valve 84.

With the mechanism described it will be understood that in one cycle of operation of the spray coater, the Geneva mechanism will move a pocket 10 and hence a tube 14 into spray position 12, hold it there momentarily and then move it beyond spray position 12. Concurrently shaft 16 will make one revolution whereby position control cam 22 acting through the follower 30 will advance the spray nozzle 25 into the tube 14, pass it through its complete movement porgram, and then withdraw it from the tube. As the spray nozzle is moved into the tube 14 the turbine control cam 46 will release flow control valve 47 to start the compressed air turbine 44 spinning and thereby rotate the spray nozzle 25.

When the nozzle reaches the FIG. 5 or first position, the lower and upper chamber cams 88, 90 will regulate the operation of the lower and upper chamber valves 82, 84 permitting compressed air to raise the piston 76 and thereby lift the valve piston 64 out of engagement with the open end 60 of the stator 38 permitting the pressurized compound to move down into the spray nozzle 25 to replenish the same as the compound starts to issue through a small radial port 98 by centrifugal force and be thrown against the wall of the container. Thus any slight spattering of compound incident to starting the flow occurs well down on the tube wall and does not have a chance to contaminate the seal area at the margin.

Thereafter, when the compound flow is well established, the position cam 22 reaches position C so that the nozzle 25 is raised to its second or uppermost coating position as shown in FIG. 6. Here the coating composition is deposited with a clean line of demarcation at the lower limit of the sealing area.

Next the position cam moves to position D, which plunges the nozzle 25 to its bottom terminal position in the container 14 to complete the coating operation, it being understood that some excess coating material is being dispensed from port 98, which excess material coats the balance of the sidewall, head and neck surfaces of the tube as it drains off into trough 100 to be reclaimed or discarded as the case may be.

While the nozzle 25 is at or near this lowermost position, cams 88 and 90 again reach their low dwell portions, thus returning valves 82 and 84 to unactuated position and again seating the valve piston 64 as shown in FIG. 8. This cuts off the flow of coating compound at or near the lowermost point of dip of the nozzle 25 and gives opportunity for the nozzle to ready itself for subsequently crossing the seal area of the tube 14 on withdrawal.

The cam 46 is so timed that its actuation of flow control valve is terminated at an instant calculated to cause the compressed air turbine to slow down and cease to rotate just a fraction of an instant after valve piston 64 moves to closed position. Thus any random drops of coating compound remaining will be thrown free after actual flow has stopped and while nozzle 25 is near the bottom of its travel. It will be understood, of course, that the feed passages in the nozzle and stator below the valve piston 64 remain essentially filled with compound and ready for instant starting on the next cycle due to the unbalanced external air pressure acting at port 98.

As the position cam 22 moves between positions D and E, withdrawing the nozzle from the container, compound flow has ceased and rotation of the nozzle very shortly stops so that as the port 98 crosses the seal area at the margin of tube 14, no residual spray or accidental deposit will occur to contaminate the seal area for adequate time delay since the bottom shutoff point has occurred to insure the completion of any chance spray activity during the cut-off period and a firm attainment of an inert, non-spraying condition of the nozzle.

The dwell period of position cam between its positions E and A provide a time interval in which the turntable 8 is indexed to bring the next tube 14 into position, whereupon the cycle repeats itself.

With this sequence of operation the spin spray is so controlled that no compound is applied to the sealing edges of the tube 14.

It is thought that the invention and many of its attendant advantages will be understood from the foregoing description, and it will be apparent that various changes may be made in the steps of the method described and their order of accomplishment without departing from the spirit and scope of the invention or sacrificing all of its material advantages, the method hereinbefore described being merely a preferred embodiment thereof.

We claim:

1. A mechanism for spray coating elongate tubular open end articles to leave a well-defined marginal portion at one end uncoated, comprising a support for holding an article with the marginal portion to remain uncoated uppermost, a spray nozzle having a predetermined spray pattern insertable into said article for the spraying operation, means for effecting relative axial movement between said nozzle and said article support so as to position said nozzle within the article and withdraw the same therefrom in each case traversing said marginal portion, and also so as to spread the coating along the length of the article wall, means for feeding coating material to said nozzle, means for controlling the flow of coating material to said nozzle, and means for so coordinating said movement effecting means and said flow controlling means as to cause flow of coating material from said nozzle during the spreading movements thereof but only while the nozzle and article are at relative positions such that the spray pattern of the nozzle is entirely below the marginal portion of the article, said coordinating means also including means for starting and stopping the flow of coating material only at times when the spray pattern is remote from said marginal portion.

2. A mechanism for spray coating tubular open end articles to leave a well defined marginal portion at one end uncoated, comprising a support for holding an article with the marginal portion to remain uncoated uppermost, a spray nozzle having a predetermined spray pattern and insertable into said article for the spraying operation, means for effecting a predetermined program of relative axial movement between said nozzle and said article support such that the nozzle first enters into the article to a first position with its spray pattern well beyond the marginal portion, then moves in the opposite relative direction to be brought to a second position wherein its spray pattern lies immediately below and adjacent the marginal portion, then without proceeding further in said opposite relative direction the nozzle again enters deeply into the article to a bottom terminal position and finally is withdrawn from the article in said opposite relative direction, means for feeding coating material to the nozzle, means for controlling the flow of coating material to the nozzle, and means for so coordinating said movement effecting means and said flow controlling means as to cause the flow to be initiated when said nozzle and article reach said first position and to continue until and be terminated when the bottom terminal position is substantially reached.

3. A mechanism as set forth in claim 2 in which the flow control means is associated with means for rotating the nozzle, and in which the nozzle rotation means is likewise coordinated with said movement effecting means to cause nozzle rotation to be initiated when said nozzle and article reach said first relative position and to continue until and be terminated when the bottom terminal position is substantially reached.

4. A mechanism as set forth in claim 3 wherein means is provided to coordinate the flow control means and the nozzle rotating means to provide for shut off of coating material an instant before nozzle rotation terminates.

5. A method of spray coating elongate tubular open end articles to leave a well defined marginal portion at one end uncoated, comprising the steps of holding an article with the marginal portion to remain uncoated uppermost, effecting relative axial motion between said article and a spray nozzle having a predetermined spray pattern such that the nozzle enters the upper end of the article and is withdrawn therefrom and in each case traverses said marginal portion, and while within the article moves up and down to spread coating on a major portion of the article interior, feeding coating material to the nozzle to provide for a spray of coating material therefrom, controlling the flow of said coating material to the nozzle to give either spraying or shutoff conditions, coordinating the relative axial motion with the flow control so as to cause spraying of coating composition while the relative position of the nozzle and article are such that the spray pattern of the nozzle is wholly below said marginal portion and prevent spraying when the nozzle and article are at a relative position such that any part of the spray pattern would be at or above said marginal portion, and starting and stopping the flow of coating material only at times when the spray pattern of the nozzle is remote from the marginal portion.

6. A method of spray coating tubular open end articles to leave a well defined marginal portion at one end uncoated, comprising the steps of holding an article with its said marginal portion uppermost, relatively moving said article and a spray nozzle in non-spraying condition to place them in a first relative position wherein the spray pattern of the nozzle would be well below the marginal portion, while in this position feeding coating material to the nozzle to cause a spray of coating material to issue therefrom against the article, relatively moving the article and spray head in an opposite relative direction to place them in a second relative position wherein the spray pattern of the nozzle lies immediately below and adjacent the marginal portion and simultaneously continuing the feeding and spraying of said coating material from said nozzle, thereafter without proceeding further in said opposite relative direction moving said article and nozzle relatively to place the nozzle deeply within the article in a bottom terminal position while continuing the feeding and spraying of coating material from said nozzle, terminating the feeding of coating material to said nozzle while in said terminal position, and finally moving the article and nozzle in said relative opposite direction to withdraw the nozzle from the article with the nozzle in non-spraying condition.

7. A method as set forth in claim 6 which includes the steps of initiating rotation of the spray nozzle when it reaches said first relative position, maintaining the rotation of said nozzle until it reaches substantially said terminal position and then terminating the rotation of said nozzle.

8. A method as set forth in claim 7 which includes the further step of terminating rotation of said spray nozzle an instant after the feeding of coating material to the nozzle is terminated.

References Cited in the file of this patent

UNITED STATES PATENTS

| | | |
|---|---|---|
| 2,141,630 | Westin | Dec. 27, 1938 |
| 2,336,946 | Marden | Dec. 14, 1943 |
| 2,480,663 | MacNab | Aug. 30, 1949 |
| 2,508,709 | Goetchius | May 23, 1950 |
| 2,512,581 | Palermo | June 20, 1950 |
| 2,654,343 | Burbank | Oct. 6, 1953 |
| 2,754,227 | Ransburg | July 10, 1956 |